(12) United States Patent
Fallon

(10) Patent No.: US 12,537,710 B2
(45) Date of Patent: Jan. 27, 2026

(54) CATEGORIZING PARTICIPANT CONTRIBUTION OF CONFERENCES

(71) Applicant: Cisco Technology, Inc., San Jose, CA (US)

(72) Inventor: Raymond M. Fallon, Oranmore (IE)

(73) Assignee: CISCO TECHNOLOGY, INC., San Jose, CA (US)

( * ) Notice: Subject to any disclaimer, the term of this patent is extended or adjusted under 35 U.S.C. 154(b) by 267 days.

(21) Appl. No.: 18/349,622

(22) Filed: Jul. 10, 2023

(65) Prior Publication Data

US 2025/0023750 A1  Jan. 16, 2025

(51) Int. Cl.
  *H04L 12/18* (2006.01)
  *G06F 3/14* (2006.01)
  *H04L 65/1089* (2022.01)

(52) U.S. Cl.
  CPC ........ *H04L 12/1831* (2013.01); *G06F 3/1454* (2013.01); *H04L 65/1089* (2013.01)

(58) Field of Classification Search
  None
  See application file for complete search history.

(56) References Cited

U.S. PATENT DOCUMENTS

| | | | |
|---|---|---|---|
| 9,674,243 B2 * | 6/2017 | Bader-Natal | ........ H04L 65/4015 |
| 11,562,657 B1 * | 1/2023 | Fieldman | ................ G09B 5/14 |
| 2013/0085745 A1 | 4/2013 | Koister et al. | |
| 2016/0314200 A1 | 10/2016 | Markman et al. | |
| 2016/0371277 A1 | 12/2016 | Allen et al. | |
| 2017/0353508 A1 * | 12/2017 | Yoakum | .............. H04L 65/4038 |
| 2018/0144235 A1 | 5/2018 | Ground, Jr. et al. | |
| 2018/0262716 A1 | 9/2018 | Kang et al. | |
| 2019/0005127 A1 | 1/2019 | Alkov et al. | |
| 2022/0239516 A1 | 7/2022 | Iyer et al. | |
| 2023/0025842 A1 | 1/2023 | Nandikotkur et al. | |
| 2023/0033852 A1 * | 2/2023 | Avrunin | ................ H04L 65/403 |
| 2023/0066511 A1 * | 3/2023 | Burd | ................... H04L 65/1093 |

OTHER PUBLICATIONS

Aboulhosn S., "Twitter Trending Topics: How They Work and How to Use Them," Sprout Social, Mar. 15, 2021, pp. 1-11.

(Continued)

*Primary Examiner* — Hemant S Patel

(74) *Attorney, Agent, or Firm* — Edell, Shapiro & Finnan, LLC

(57) ABSTRACT

A non-transitory computer-readable medium has instructions that, when executed by one or more processors, cause the one or more processors to perform operations that include receiving a contribution provided by a participant in a video session and/or audio session, determining whether a type of the contribution is a question or a comment, storing the contribution and its type, determining whether a total quantity of received contributions exceeds a threshold, classifying each received contribution into an appropriate category of a plurality of categories in response to determining the total quantity of received contributions exceeds the threshold, and outputting the received contributions and their categories for display to one or more additional participants in the video session and/or audio session.

20 Claims, 12 Drawing Sheets

(56) References Cited

OTHER PUBLICATIONS

Benesova K., et al., "Cost-Effective Deployment of BERT Models in a Serverless Environment," Proceedings of the 2021 Conference of the North American Chapter of the Association for Computational Linguistics: Human Language Technologies: Industry Papers, Jun. 2021, pp. 187-195.

Bougouin A., et al., "TopicRank: Graph-Based Topic Ranking for Keyphrase Extraction," International Joint Conference on Natural Language Processing (IJCNLP), Oct. 2013, pp. 543-551.

Dong R., et al., "Topic Extraction from Online Reviews for Classification and Recommendation," Proceedings of the Twenty-Third International Joint Conference on Artificial Intelligence (IJCAI13), Aug. 2013, 8 pages.

Huber J., "Facebook Live for Brands: 10 Essential Tips for a Successful Stream," Sprout Social, Jun. 23, 2021, pp. 1-9.

Meng Z., et al., "Detecting Topics and Overlapping Communities in Question and Answer Sites," Social Network Analysis and Mining, vol. 5, Dec. 2015, pp. 1-27.

Mihalcea R., et al., "TextRank: Bringing Order into Texts," Proceedings of the 2004 Conference on Empirical Methods in Natural Language Processing, Jul. 2004, 8 pages.

Sheikh M., "The Complete Guide to Streaming on YouTube Live," Sprout Social, Nov. 9, 2022, pp. 1-20.

"Teacher Convention," Slido, Jun. 2022, 2 pages, https://app.sli.do/event/9EiTa1Nqz1h3sSU4PetrvT/live/questions.

Velden T., et al., "Comparison of Topic Extraction Approaches and Their Results," Feb. 9, 2017, pp. 1-66.

\* cited by examiner

FIG. 4

CATEGORIZING PARTICIPANT CONTRIBUTION OF CONFERENCES

TECHNICAL FIELD

The present disclosure relates to video presentations.

BACKGROUND

Conferences are used to connect multiple users to one another for communication. In an example implementation, a conference enables different participants, such as participants at different geographical locations, to observe (e.g., see, hear) video content and/or audio content. For instance, the content may include a presenter or speaker providing visual information and/or audio information. During the conference, participants may also provide contributions, including questions, comments, responses, and so forth. Unfortunately, participants may not provide contributions in an organized manner. For example, contributions related to different categories or subject matter may be disorderly provided. Thus, it may be difficult for someone to view and comprehend the contributions efficiently. As an example, a moderator who is tasked with responding to questions may have difficulty answering questions in a chronological order when certain questions relate to different completely different issues. Thus, responses to the questions may not be effectively provided.

BRIEF DESCRIPTION OF THE DRAWINGS

FIG. 4 shows an example UI that displays customizable settings for categorizing contributions, according to an example embodiment.

DETAILED DESCRIPTION

Overview

Figure 1:
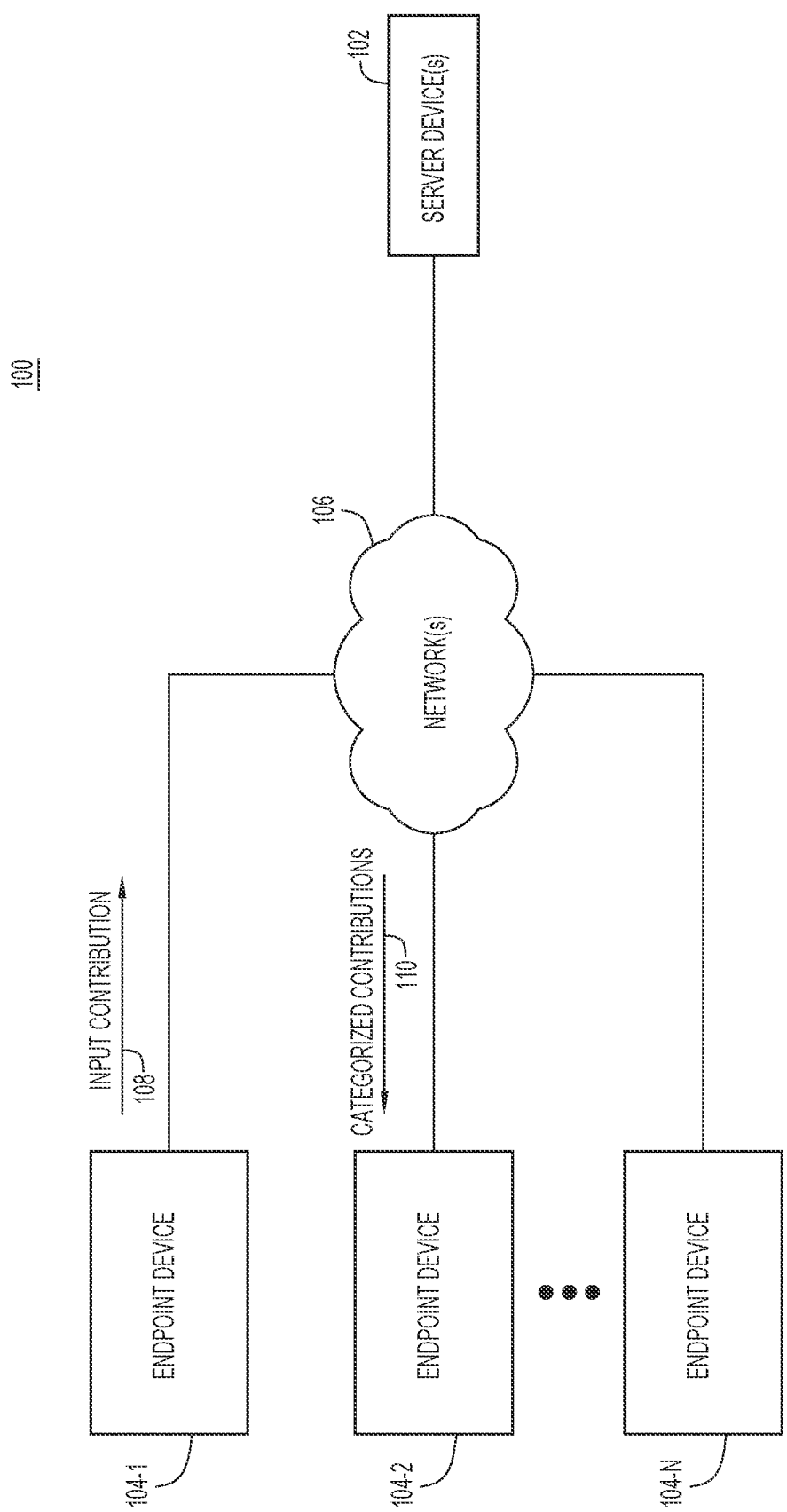
FIG. 1 is a block diagram of a conference system configured to categorize and organize contributions provided by participants of a conference, according to an example embodiment.

In one embodiment, a method is provided that includes receiving a contribution provided by a participant in a video session and/or audio session, determining whether a type of the contribution is a question-type or a comment-type, storing the contribution and its type, determining whether a total quantity of received contributions exceeds a threshold, classifying each received contribution into an appropriate category of a plurality of categories in response to determining the total quantity of received contributions exceeds the threshold, and outputting the received contributions and their categories for display to one or more additional participants in the video session and/or audio session.

EXAMPLE EMBODIMENTS

Conferences and other group presentations or meetings are used to provide content in different settings. For example, a conference includes a presenter or speaker that provides information via visual content and/or audio content. Various participants are able to observe the presenter by viewing the visual content and/or listening to the audio content. For instance, a device of each participant displays the visual content and/or outputs the audio content to the participant. During the conference, each participant may be able to provide a contribution. Such a contribution may include a question, a comment, a response (e.g., to a question provided by another participant), feedback, general conversational communication, and so forth. By way of example, a participant inputs the contribution as text, which is then displayed to other participants for view.

Unfortunately, contributions may not be provided in an organized manner. For example, participants may simultaneously or sequentially provide contributions that relate to different subject matters. As a result, it may be difficult for an individual to view the contributions (e.g., chronologically) and efficiently comprehend the contributions, such as without diverting significant attention away from other content being provided. Additionally or alternatively, it may be difficult for an individual to search or reference a specific contribution (e.g., related to a particular subject matter of interest). Thus, it may correspondingly be difficult to perform an action related to the contribution. By way of example, a moderator may be tasked with responding to questions provided by the participants. However, disorderly grouping of the contributions may reduce the ability of the moderator to respond to the questions in an efficient manner. For instance, a lack of organization of the contributions may force the moderator to spend longer amounts of time to comprehend a question, filter through questions (e.g., questions that are outside of the expertise of the moderator), find different references or materials to answer unrelated questions, or otherwise address the questions. As a result, responses to questions may be delayed, ineffective, incomplete, dissatisfactory, and so forth.

For this reason, organizing the contributions and presenting the contributions in a comprehensible manner may improve the experience of conferences. For example, received contributions are classified into appropriate categories, and the contributions and categories are output for display. The display of contributions and categories may improve experience associated with viewing of the contributions. By way of example, organizing the contributions based on categories may group similar contributions together such that the contributions can be more easily identified, searched, and understood (e.g., without having to analyze and process contributions related to other categories). Additionally, the display of received contributions may be more customizable. For instance, a user may indicate a quantity of categories in which contributions are to be classified and/or a type (e.g., questions vs. comments) of contributions to be displayed. In this manner, the display of contributions can accommodate different user preferences, further improving the experience of each user. Further still, categorization of contributions can be suitably updated. As an example, contributions may be re-categorized after receipt of a certain quantity of additional contributions. In other words, contributions are classified into new categories when a quantity of contributions equal to a multiple of a set quantity have been received. As another example, a change in topic of the conference may be determined, and contributions may be re-categorized after receipt of a certain quantity of contributions since the change in topic. By updating the categorization of contributions, the contributions may be classified more appropriately, such as to account for receipt of additional contributions that may not be closely related to previously received contributions. Thus, the organized display of contributions may be maintained as additional contributions are received.

It should be noted that although the present disclosure primarily describes techniques implemented in a video session, it should be noted that the features described herein may be implemented in any other suitable context. For example, techniques related to categorization of contributions may be performed in an audio session, such as a radio broadcast, a telephone broadcast, or a live podcast, which includes audio content but may not include video content.

With the preceding in mind, FIG. 1 shows a block diagram of a conference system 100 that is configured to organize and categorize contributions. The conference system 100 includes one or more server device(s) 102 (e.g., meeting server(s)) and a plurality of endpoint devices 104-1, 104-2, ..., 104-N (sometimes referred to herein individually as an endpoint device (or end user device or client) 104 or collectively as endpoint devices 104) that communicate with the server device(s) 102 via one or more networks 106. Each of the endpoint devices 104-1 to 104-N may be a tablet, a laptop computer, a desktop computer, a mobile phone, a virtual desktop client, a virtual whiteboard, or any user device now known or hereinafter developed. The endpoint device 104-1 to 104-N may have a display to present video data and/or audio data. The endpoint devices 104-1 to 104-N may also have short-range wireless system connectivity (such as Bluetooth™ wireless system capability, ultrasound communication capability, etc.) to enable local wireless connectivity with a video or audio endpoint device in a meeting room or with other user devices in the same meeting room. The endpoint devices 104-1 to 104-N may store content (e.g., a presentation, a document, images, etc.) for sharing content, such as with other user devices during a conference. In some embodiments, the endpoint devices 104-1 to 104-N may be endpoint devices for facilitating communication with the server device(s) 102 during a conference. The endpoint devices 104-1 to 104-N may additionally connect to user devices (not illustrated in FIG. 1) for sharing content stored on the user devices during the conference.

In some cases, the endpoint devices 104-1 to 104-N may be videoconference endpoint or audioconference endpoints designed for personal use (e.g., a desk device user by a single user) or for use by multiple users (e.g., a videoconference endpoint or audioconference endpoint in a meeting room). In some embodiments, the endpoint devices 104-1 to 104-N may be configured to open content to display or share (e.g., when a digital whiteboard is accessed directly on the endpoint device 104). By way of example, the first endpoint device 104-1 may receive (e.g., via a camera or other visual sensor) video data of a first user that is using the first endpoint device 104-1. The video data may be transmitted from the first endpoint device 104-1 to the second endpoint device 104-2, and the second endpoint device 104-2 may display the video data of the first user. A second user that is using the second endpoint device 104-2 may then see the video data of the first user via the second endpoint device 104-2. Similarly, the first endpoint device 104-1 may receive (e.g., via a microphone or other audio sensor) audio data of a first user that is using the first endpoint device 104-1. The audio data may be transmitted from the first endpoint device 104-1 to the second endpoint device 104-2, and the second endpoint device 104-2 may output the audio data of the first user. A second user that is using the second endpoint device 104-2 may then hear the audio data of the first user via the second endpoint device 104-2

The server device(s) 102 may be configured to provide an online meeting service for hosting a video session and/or an audio session among the endpoint devices 104-1 to 104-N in a conference implementation. The server device(s) 102 may also receive and organize contributions provided by any of the endpoint devices 104-1 to 104-N. In the example illustrated in FIG. 1, the first endpoint device 104-1 receives input contributions 108, such as a question and/or comment. The input contributions 108 may be provided by the first user, such as by typing words on a keyboard, via voice input and transcription, by selecting an option on a menu, and/or by providing any other suitable user input. The first endpoint device 104-1 transmits the input contributions 108 to the server device(s) 102 via the network(s) 106. The server device(s) 102 may then analyze the input contributions 108. For example, the server device(s) 102 may categorize the input contributions 108 by generating categories based on the input contributions 108 and classifying each input contribution 108 into a corresponding category. The server device(s) 102 may then output categorized contributions 110 to the second endpoint device 104-2 via the network(s) 106 for display by the second endpoint device 104-2. For instance, the categorized contributions 110 includes the input contributions 108 organized and grouped by their categories. In this manner, the categorized contributions 110 may provide a more comprehensible display of the input contributions 108. Thus, the server device(s) 102 may improve case of understanding of the input contributions 108 originally provided by the first user. That is, the second user may be able to view the categorized contributions 110 more efficiently as compared to viewing of the input contributions 108 in the original manner provided by the first user. In some embodiments, the server device(s) 102 may also determine a type of each input contribution 108, such as whether the input contribution 108 is a question-type or a comment-type, determine a timestamp of each input contribution 108, determine the specific endpoint device 104-1 from which each input contribution 108 is received, and so forth, and the server device(s) 102 may also transmit such information to the second endpoint device 104-2 for display. The server device(s) 102 may further store the input contributions 108, as well as other information related to each input contribution 108, to enable retrieval at a later time.

Although the functions related to the input contributions 108 are performed at the server device(s) 102 in the example described with respect to FIG. 1, the functions of the server device(s) 102 may be performed at an endpoint device 104 or a different device not illustrated in FIG. 1. That is, any of the endpoint devices 104-1 to 104-N may perform operations to organize and categorize contributions.

Figure 2:
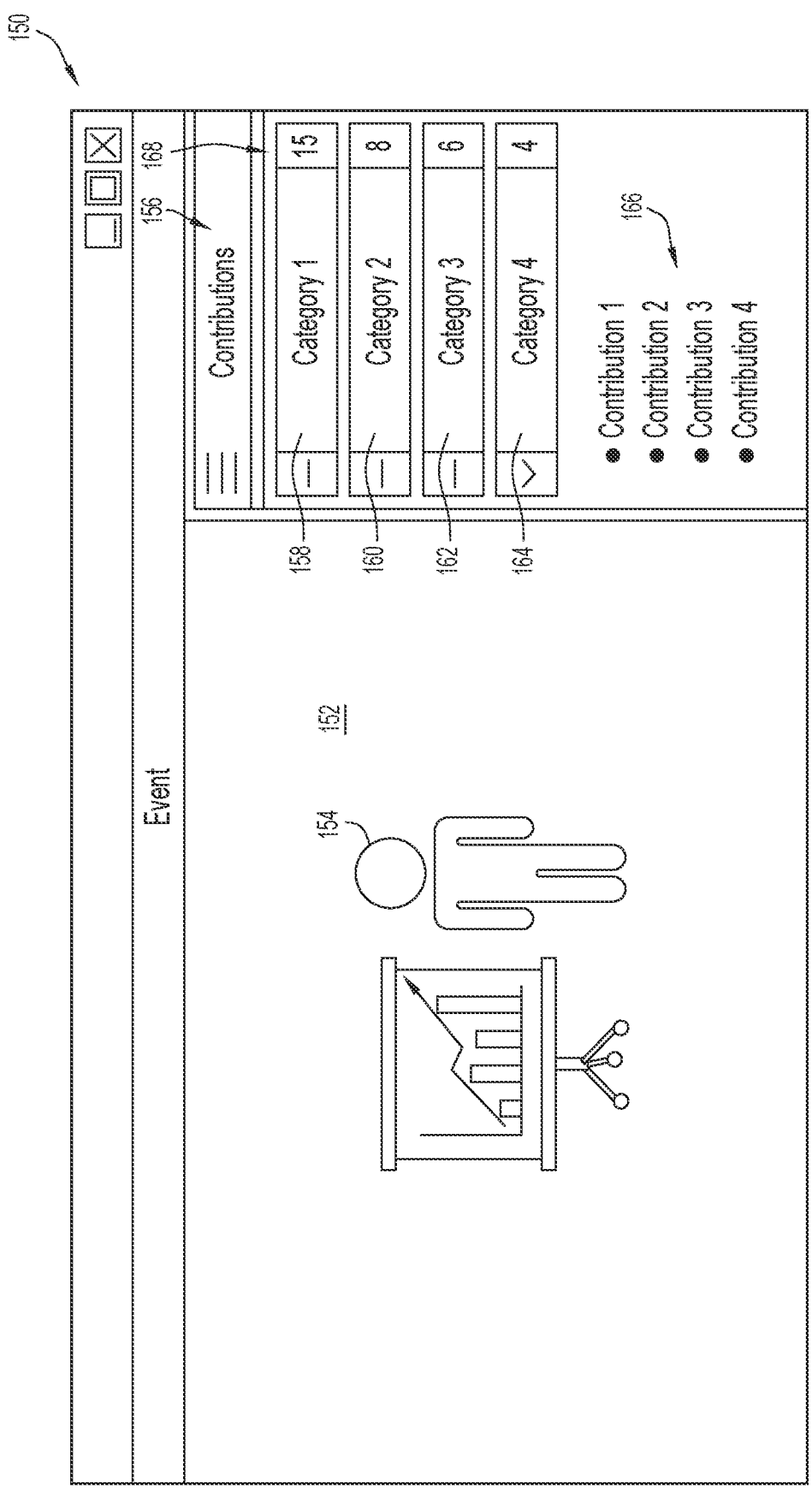
FIG. 2 shows an example user interface (UI) that displays categorized contributions, according to an example embodiment.

FIG. 2 is an example user interface (UI) 150 displaying categorized contributions during a video presentation. However, it should be noted that the UI 150 may be used to display categorized contributions for any other suitable type of conference, such as an audio presentation. The UI 150 may, for instance, be displayed via any of the endpoint devices 104-1 to 104-N. The UI 150 may include a first portion or section 152 (e.g., a video portion or section) that displays video content, such as imagery captured by another one of the endpoint devices 104. For example, the first portion 152 may include a presenter 154, and other users utilizing the endpoint devices 104-1 to 104-N can observe the presenter 154 via the UI 150. In addition, any of the users of the endpoint devices 104-1 to 104-N can submit a contribution during the video presentation, such as by interacting with the UI 150. The server device(s) 102 may receive the contributions submitted by the users via the endpoint devices 104-1 to 104-N and categorize the contributions. That is, the server device(s) 102 may classify or assign each contribution into an appropriate category. The server device (s) 102 may then output the contributions and their corresponding categories to the endpoint devices 104-1 to 104-N for display via the UI 150.

For instance, the UI 150 includes a second portion or section 156 (e.g., a contributions portion or section) that displays the contributions and categories received from the server device(s) 102. The illustrated second potion 156 displays a first category 158, a second category 160, a third category 162, and a fourth category 164. Contributions classified into each category are then displayed accordingly. By way of example, in the illustrated UI 150, the fourth category 164 is selected for view, and contributions 166 classified into the fourth category 164 are displayed as a result. In other words, the contributions 166 are grouped together based on their association with the fourth category 164, and the contributions 166 are displayed upon selection of the fourth category 164. However, the first category 158, the second category 160, and the third category 162 are not selected for view, so the contributions classified into the first category 158, the second category 160, and the third category 162 are not displayed. In this way, the contributions are displayed in a more organized manner, such as by displaying similar contributions (e.g., contributions classified into the same category) together. Additionally, the contributions may be selectively displayed based on their corresponding categories being selected for view. Such display of the contributions may avoid overwhelming the user and may enable the user to understand the contributions more efficiently. The organized manner in which the contributions are displayed may also reduce possible duplications of contributions. By way of example, a user wanting to ask a question related to a specific category may first navigate to the specific category and determine whether any similar questions had already been asked. The user may quickly be able to search through relevant questions via the second portion 156 as compared to, for instance, searching through questions that are not grouped together by category.

In this way, the user experience with respect to the video presentation may be improved.

In some embodiments, the contributions 166 being displayed may be the original submission provided by the corresponding users. That is, the contributions 166 themselves, as opposed to the organization or grouping, may not be modified. In additional or alternative embodiments, the contributions 166 may be modified from the original submission, and the modified versions of the contributions 166 may be displayed. By way of example, each contribution 166 may be summarized to reduce a length of each contribution 166. The summary of the contribution 166 may then be displayed. Display of the summary of the contributions 166 may further facilitate efficient comprehension of the contributions 166.

The UI 150 may also display counts 168 indicating a quantity of contributions classified into each category. The user may utilize the counts 168 to determine categories that may be more popular or discussed during the video presentation. As an example, the user may determine which category to select based on the counts 168, such as to display a category having a relatively greater quantity of contributions to determine whether other users have increased concerns regarding the category. For instance, categories may be sequentially organized based on the counts 168, such as by displaying categories having a greater quantity of contributions near the top of the UI 150 to increase the attention of the user. The counts 168 may therefore further improve the user experience for navigating the contributions.

Figure 3:
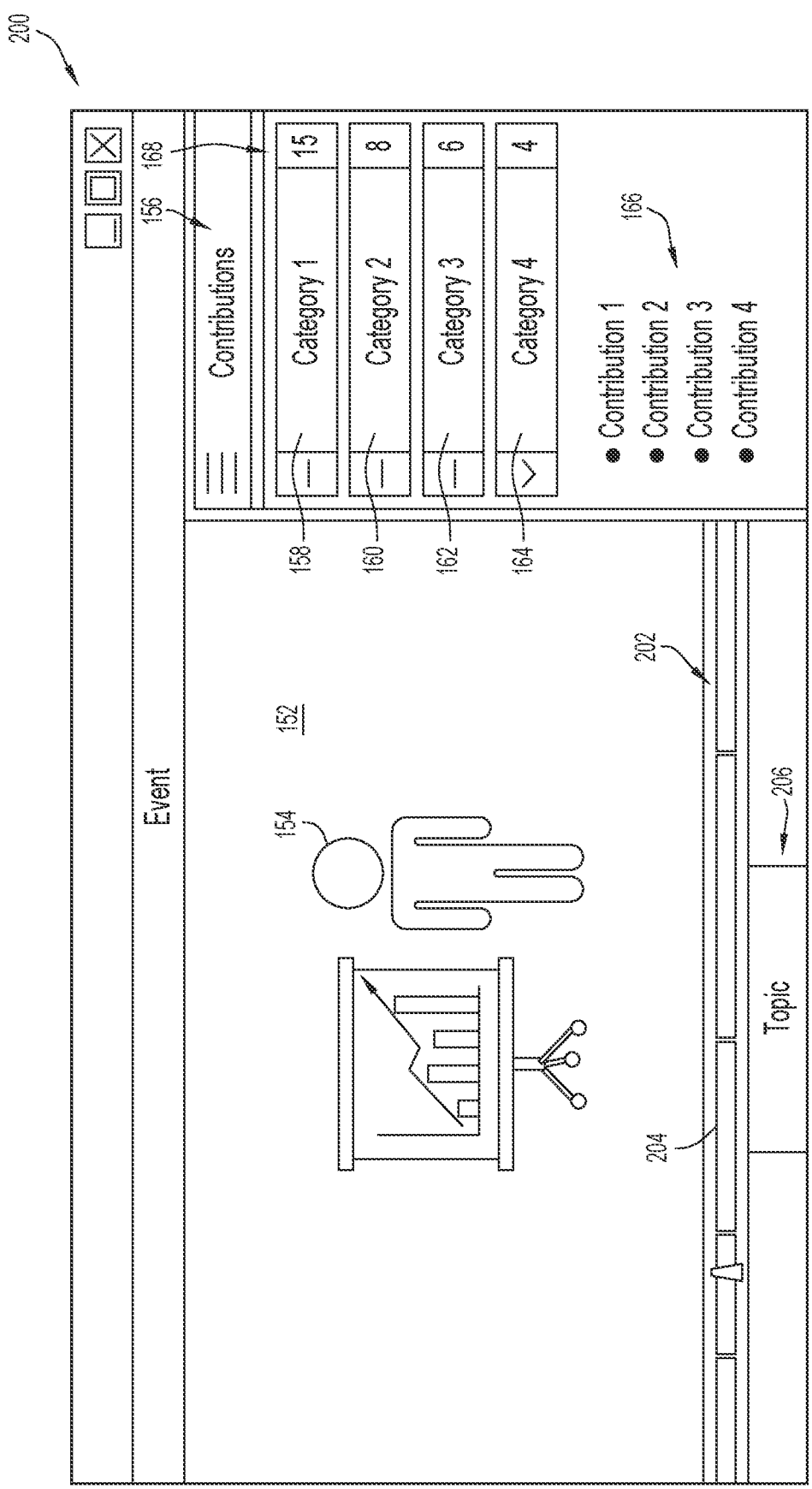
FIG. 3 shows an example UI that displays categorized contributions for a selected timestamp of a conference, according to an example embodiment.

FIG. 3 is an example UI 200 displaying categorized contributions during a video presentation. However, it should be noted that the UI 200 may be used to display categorized contributions for any other suitable type of conference, such as an audio presentation. Any of the endpoint devices 104-1 to 104-N may display the UI 200. The illustrated UI 200 includes the first portion 152, the second portion 156, as well as a third portion or section 202 (e.g., a navigation portion) that may be used to navigate to different parts of a video presentation. As an example, the third portion 202 may include a control feature 204 (e.g., a slider) that may be utilized to select a timestamp of the video presentation for displaying the video, the categories, and the contributions related to the timestamp of the video presentation.

For instance, different timestamps of the video presentation may be related to different topics that are being presented, and the user may select a particular timestamp to determine various content or information related to the corresponding topic. By way of example, the user may be particularly interested in a financial topic discussed during the video presentation, so the user may navigate to the timestamp of the video presentation related to the financial topic by using the control feature 204. In one implementation, the user may utilize the UI 200 after the video presentation has been completed in order to view a certain topic of interest. Additionally or alternatively, the user may utilize the UI 200 while the video presentation is occurring to review previously discussed topics. To facilitate navigation based on topic, the third portion 202 may include a topic display 206 that indicates the particular topic related to the timestamp selected by the user. In this manner, the user may determine whether the desired timestamp has been selected based on the topic display 206. Additionally, the control feature 204 may include distinct segments or sections that are divided based on topic. That is, each segment is related to a different topic. Thus, the user may be able to select timestamps related to different topics more easily via the control feature 204 by observing the segments in which the control feature 204 is divided.

In order to provide information to the endpoint devices 104-1 to 104-N that enables display of time-related content via the UI 200, the server device(s) 102 may associate various information with a corresponding timestamp of the video presentation. For example, the server device(s) 102 may associate the first category 158, the second category 160, the third category 162, and the fourth category 164, as well as their classified contributions and quantity of classified contributions, with a first timestamp in which the categories 158, 160, 162, 164 are generated. Thus, upon selection of the first timestamp by the user, the categories 158, 160, 162, 164 and their classified contributions and quantity of classified contributions are displayed via the UI 200. However, upon selection of a second timestamp that is not associated with the categories 158, 160, 162, 164, the categories 158, 160, 162, 164 and their classified contributions and quantity of classified contributions may not be displayed. As such, the association between the timestamps of the video presentation and the categories 158, 160, 162, 164 may enable the categories 158, 160, 162, 164 to be more appropriately displayed based on the timestamp selected by the user.

Moreover, the server device(s) 102 may determine a topic associated with different timestamps of the video presentation. In some embodiments, the server device(s) 102 may determine the topic based on detected words (e.g., spoken by the presenter 154) and extraction of information from the detected words. In additional or alternative embodiments, the server device(s) 102 may determine the topic based on a user input. The server device(s) 102 may provide the association between topics and timestamps to the endpoint devices 104-1 to 104-N to enable the appropriate topic to be displayed at the topic display 206 based on the timestamp selected by the user.

Other information related to timestamps of a video presentation may be provided in further embodiments. As an example, statistics related to a trend of categories at different timestamps of the video presentation may be displayed. As another example, information related to specific participants who provided the contributions at different timestamps of the video presentation may be provided. Regardless, time-related information may indicate how contributions may change as a result of a change in presentation topic.

Figure 4:
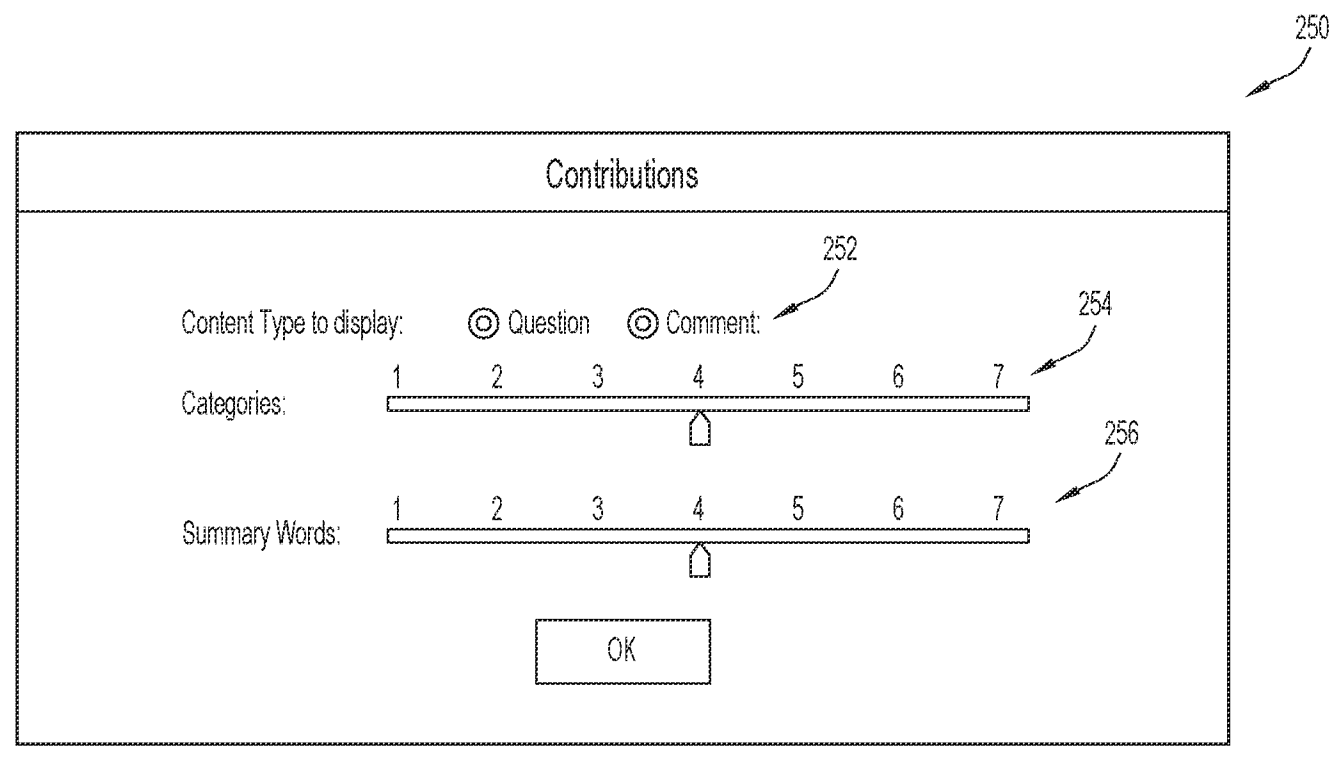

FIG. 4 is an example UI 250 that displays various control features that may be used to manage settings or parameters for categorizing contributions. For example, the UI 250 may be displayed by any of the endpoint devices 104-1 to 104-N and utilized to adjust display of the UI 150 and/or of the UI 200 via the endpoint devices 104-1 to 104-N. The UI 250 may include a first control feature 252, which a user may utilize to select a type of contributions to be displayed. That is, the user may indicate the type via the first control feature 252, and contributions that are not of the indicated type may be removed or blocked from display. The UI 250 may also include a second control feature 254, which a user may utilize to select a quantity of categories for categorizing contributions. Thus, the user may select the quantity of categories via the second control feature 254, and the server device(s) 102 may generate categories based on the contributions and in accordance with the selected quantity of categories for classification of the contributions such that a quantity of the generated categories matches the selected quantity of categories. The UI 250 may further include a third control feature 256, which a user may utilize to select a quantity of words for a summary of each contribution. As such, the user may select the quantity of words via the third control feature 256, and the server device(s) 102 may generate a summary of each contribution in accordance with the selected quantity of words such that the quantity of words for each summary matches the selected quantity of words. In this manner, the UI 250 may increase customization, such as to enable the UI 150 and/or the UI 200 to be displayed in a more suitable manner preferred by the user.

Although the illustrated first control feature 252 includes radio button features and each of the second control feature 254 and the third control feature 256 includes slider features, it should be noted that the first control feature 252, the second control feature 254, and/or the third control feature 256 may include any other feature, such as a text entry box, an arrow scroll feature, or any suitable feature with which a user may interact to provide information for customized display of contributions. Indeed, the first control feature 252, the second control feature 254, and the third control feature 256 may utilize the same or different features.

Figure 5:
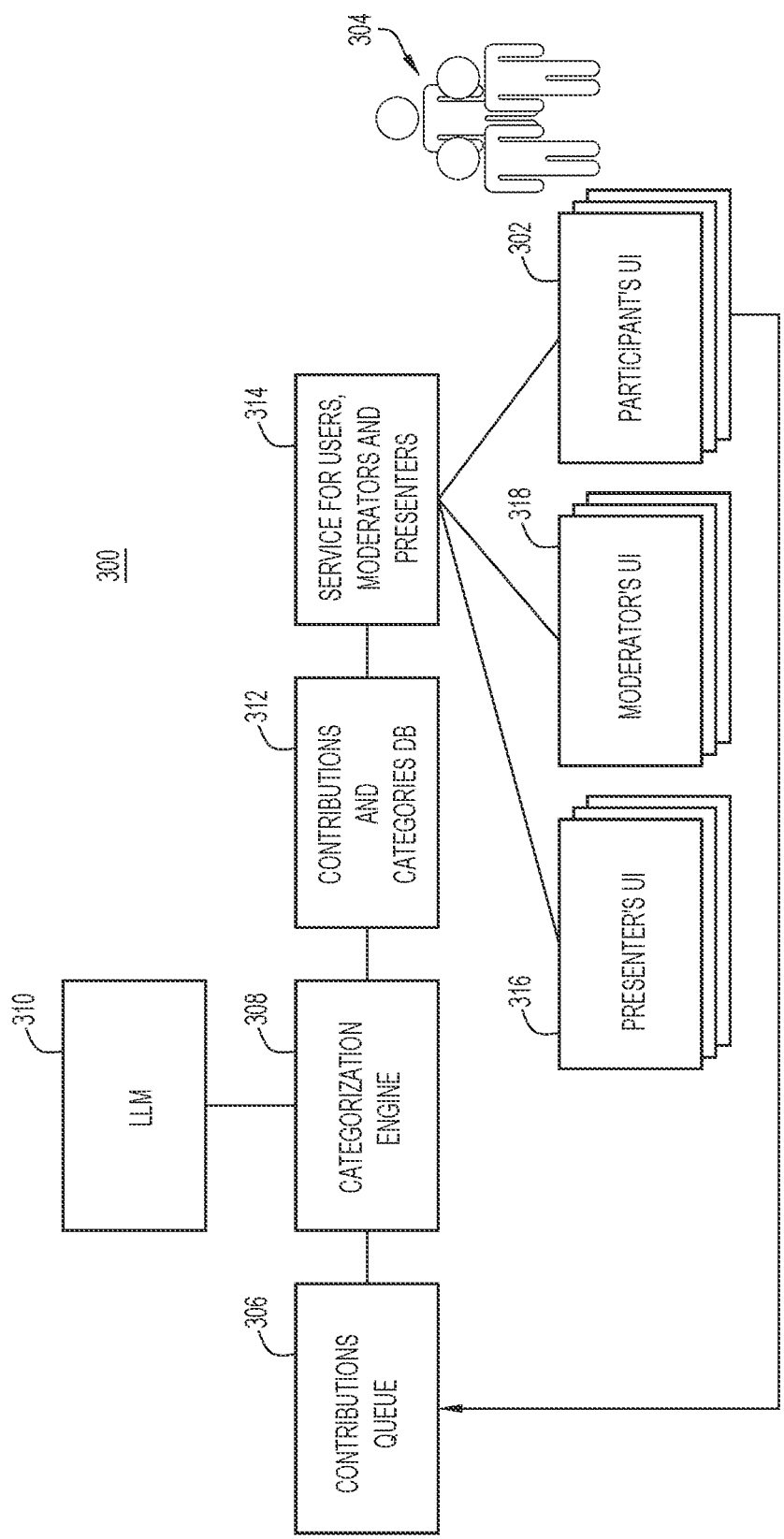
FIG. 5 is a sequence diagram illustrating a workflow to process contributions, according to an example embodiment.

FIG. 5 is a sequence diagram of a workflow 300 for processing contributions. For example, participant UIs 302 (e.g., one of the endpoint device 104-1 to 104-N) receive a contributions input by participants 304 and forward each contribution to a contributions queue 306. The contributions queue 306 forwards the contributions to a categorization engine 308, such as in a sequential manner received from the different participant UIs 302. The categorization engine 308 then categorizes the contributions by generating categories and classifying each contribution into the appropriate category. In some embodiments, the categorization engine 308 may utilize one or more large language models (LLMs) 310 to extract information from each contribution, such as keywords and/or subject matter, for categorization of the contributions. The contributions and classified categories are then stored in a database 312. A service module 314 may query the database 312 to retrieve the stored contributions and categories, and the service module 314 may provide information that causes the participant UIs 302, a presenter UI 316, and a moderator UI 318 to display the contributions and categories accordingly. Thus, the manner in which the contributions and categories are displayed via the participant UIs 302, the presenter UI 316, and the moderator UI 318 may be more comprehensible, intuitive, and/or effective.

In some embodiments, the participant UIs 302, the presenter UI 316, and the moderator UI 318 may display different information and/or display information in a different format from one another. As an example, the participant UIs 302 may include the UI 250 that enables customization of how contributions are categorized and displayed. As another example, the presenter UI 316 may not initially display contributions to avoid distracting the presenter. As a further example, the moderator UI 318 may display certain contributions related to a specific category (e.g., a category of which a moderator is an expert) and not contributions related to other categories. In this way, the service module 314 may provide different information otherwise cause the different UIs 302, 316, 318 to output different displays. In additional or alternative embodiments, the participant UIs 302, the presenter UI 316, and the moderator UI 318 may display the same information and in the same format. In such embodiments, the service module 314 may provide the same information to cause the UIs 302, 316, 318 to output the same display.

The service module 314 may output the information for display via the participant UIs 302, the presenter UI 316, and the moderator UI 318 in real time. Thus, the participant UIs 302, the presenter UI 316, and the moderator UI 318 may display categorized contributions as the contributions are submitted by participants. Additionally or alternatively, the service module 314 may output the information for display at a different time. For example, the service module 314 may output the information to one of the participant UIs 302 after completion of the conference (e.g., a video presentation, an audio presentation), such as to enable a participant to review previously submitted contributions. For this reason, the contributions and classified categories stored in the database 312 may be readily retrievable to enable the service module 314 to query the database 312 and output information.

As discussed herein, contributions and classified categories may be displayed based on a selected timestamp of the conference. To this end, the categorization engine 308 may be configured to associate each contribution and category with a timestamp, and the timestamp may be stored with the corresponding contribution and category. The service module 314 may then retrieve the timestamp for displaying associated contributions and categories, such as based on a timestamp selected by a user.

In some embodiments, the server device(s) 102 may include the contributions queue 306, the categorization engine 308, the LLM 310, the database 312, and/or the service module 314. Thus, the server device(s) 102 may perform at least some of the processing of contributions. As a result, greater scalability and sustainability of operation may be achieved. That is, multiple, different endpoint devices 104 may be able to display categorized contributions via the server device(s) 102 without having to modify or configure each of the endpoint devices 104 (e.g., to enable each individual endpoint device 104 to categorize contributions). Thus, categorization of contributions may be more readily implemented for display. However, in some embodiments, certain processing of contributions may be performed by any of the endpoint devices 104. By way of example, an endpoint device 104 may store the contributions and their classified categories for retrieval at a later time.

It should be noted that contributions may be re-categorized. That is, categorization of contributions may be repeated or updated, such as to provide a more appropriate organization or grouping of contributions as additional contributions are received. For example, additional contributions may not adequately relate to an existing category. Thus, a new category may be generated for classification of an additional contribution. In embodiments in which summaries of contributions are determined and displayed, the summaries may also be updated upon performing re-categorization.

Each of FIGS. 6-10 described below illustrates a method for operating with respect to categorizing contributions. In some embodiments, each method may be performed by the same device, such as by the server device(s) 102 and/or by an endpoint device 104. In additional or alternative embodiments, certain steps of the same method and/or of different methods may be performed by different devices. Moreover, it should be noted that any of the methods may be performed in a different manner than depicted. For example, a step may not be performed, an additional step may be performed, and/or certain steps may be performed in a different order. Further, the steps of the same method or of different methods may be performed in any relation with one another, such as concurrently or in response to one another. Further still, the steps of any of the methods may be repeatedly performed.

Figure 6:
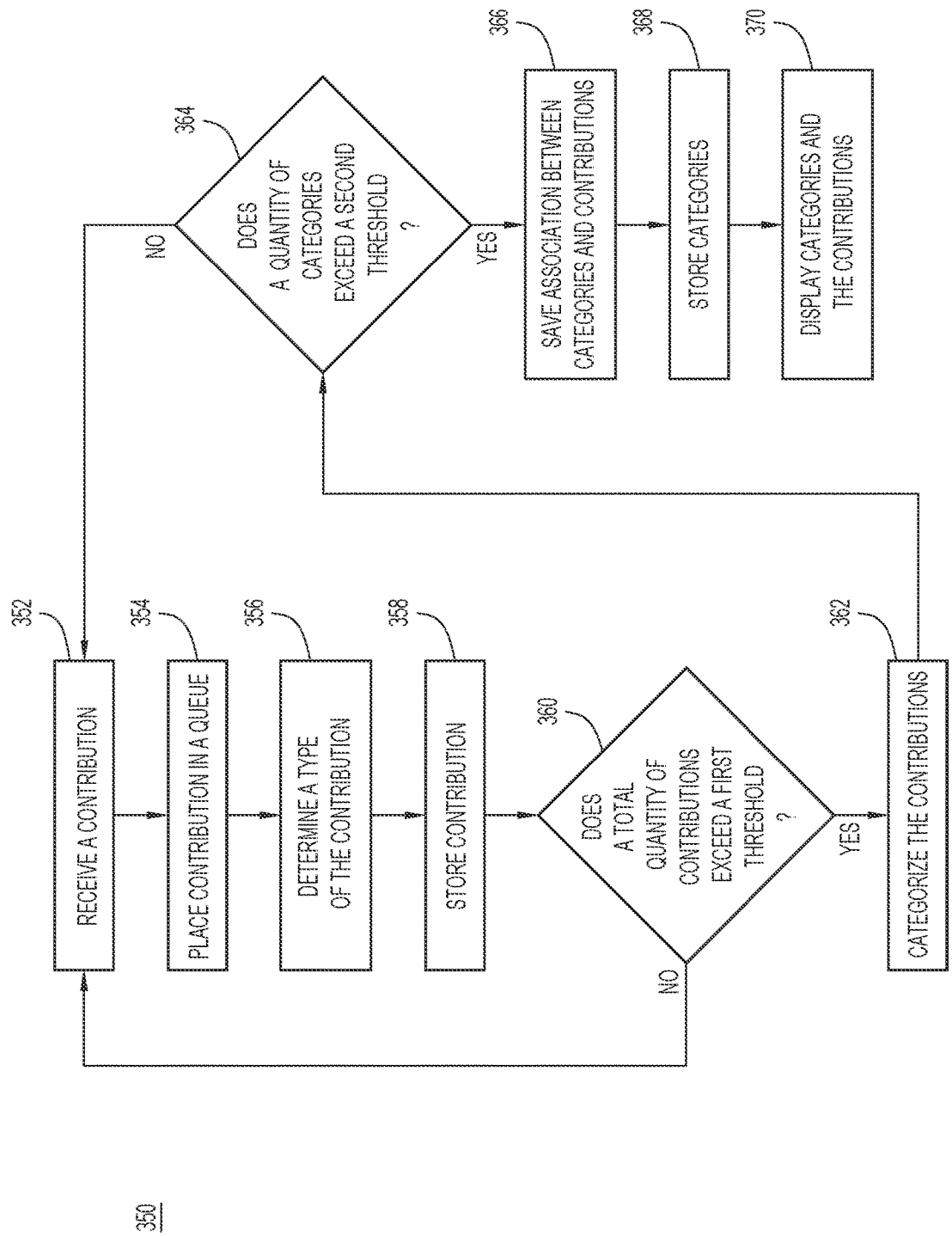
FIG. 6 is a flowchart illustrating a method of categorizing contributions, according to an example embodiment.

FIG. 6 is a flowchart illustrating a method 350 of categorizing contributions (e.g., during a conference, such as a video presentation or audio presentation). At step 352, a contribution is received. For example, a user may input the contribution, such as by using an endpoint device. At step 354, the received contribution is placed in a queue. For example, multiple contributions may be received simultaneously or close in proximity with the contribution received at step 352. Each contribution may be placed in the queue to enable processing of the contributions in a more effective (e.g., efficient) manner. For instance, contributions provided by different endpoint devices may be sequentially ordered in the queue based on time of receipt, and contributions may be chronologically pulled from the queue for processing.

After the contribution is pulled from the queue for further processing (e.g., after previously queued contributions have been processed), at step 356, a type of the received contribution is determined. For example, a determination may be made regarding whether the contribution is a question, a comment, a response, and so forth, using LLM or other language processing technique. At step 358, the contribution is stored. In some embodiments, certain information related to the contribution may also be stored. For example, the type of contribution, a timestamp of the contribution, and/or an endpoint device (or user associated with the endpoint device) providing the contribution may be stored.

At step 360, a determination is made regarding whether a total quantity of contributions, which may include the received/stored contribution and previously received/stored contributions, exceeds a first threshold (e.g., a quantity between 10 and 15, between 15 and 20, between 20 and 25, or more than 25). That is, a determination is made regarding whether a sufficient amount of contributions have been received such that categorization of the contributions would be beneficial. In response to a determination that the total quantity of contributions does not exceed the first threshold (e.g., the amount of contributions is not sufficient), no further action may be performed with respect to the current contributions, and an additional contribution may be received for processing.

However, in response to a determination that the total quantity of contributions exceeds the first threshold (e.g., the amount of contributions is sufficient), at step 362, the contributions may be categorized. To this end, words of the contributions are analyzed (e.g., using an LLM) to determine content or subject matter of the contributions. The determined content or subject matter of the contributions are then used to generate categories, and each contribution is classified into an appropriate category that is most closely related to the contribution. Thus, similar contributions (e.g., contributions related to a common category) are grouped together. In some embodiments, each contribution may be classified into a single category. As such, different categories may be exclusive from one another. Alternatively, contributions may be classified into multiple categories. Thus, different categories may include some overlap of contributions.

At step 364, a determination is made regarding whether a quantity of categories exceeds a second threshold (e.g., three categories, four categories, five or more categories). That is, a determination is made regarding whether a sufficient amount of categories have been generated such that display of the categories and their classified contributions is beneficial. In response to a determination that the quantity of categories does not exceed the second threshold (e.g., the quantity of categories is insufficient), no further action may be performed. For example, it may not be beneficial to display a low quantity of categories, because the contributions may not be sufficiently distinct from one another to provide an organized display. Thus, display of the categories is blocked, and an additional contribution may be received for processing.

However, in response to a determination that the total quantity of categories exceeds the second threshold (e.g., the quantity of categories is sufficient), at step 366, the association between the categories and their classified contributions is saved. For example, the contributions may be sufficiently distinct from one another to prompt proceeding with organizing the contributions for display. At step 368, the categories and the classified contributions are then stored. Additional information related to the categories, such as the timestamp of the categories, may also be stored. At step 370, the categories and the classified contributions are displayed. For example, for each category being displayed, the contributions classified into the category are grouped and displayed with the category. In this manner, a user observing the display of categories and contributions may determine the similarities between contributions classified into the same category and be able to understand, search, and/or respond to the contributions more efficiently. In some embodiments, additional information related to the categories and/or the contributions may be displayed. By way of example, a quantity of classified contributions for each category and/or a participant who submitted each contribution may be displayed to provide additional information.

It should be noted that categories and contributions may be retrieved from storage for display at a later time, such as after conclusion of the conference. For example, by storing the contributions and the categories with an associated timestamp, a particular timestamp of the conference may be selected, and the categories and classified contributions associated with the particular timestamp may be displayed in response. Thus, storage of the categories and of the contributions, along with storage of related information, may enable the categories and contributions to be readily accessible for display at a different time.

Figure 7:
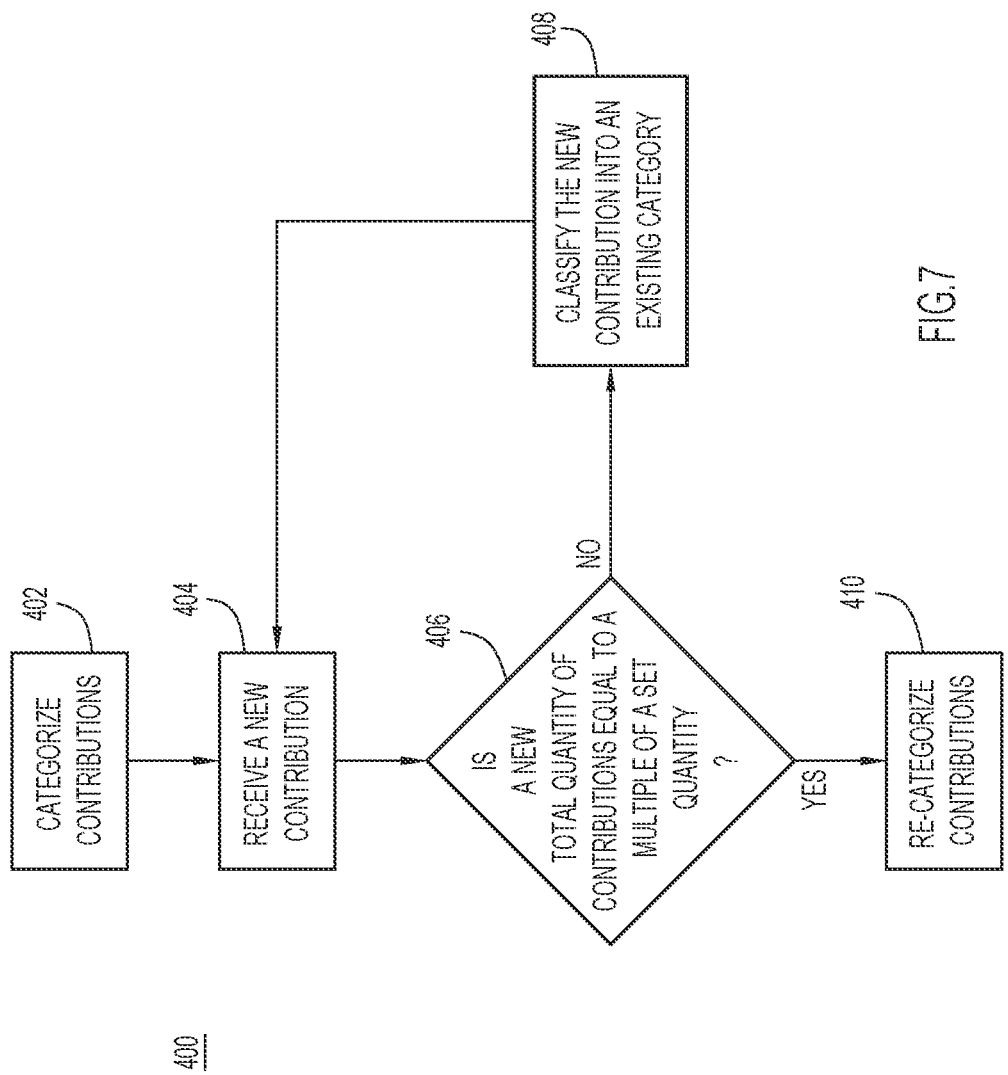
FIG. 7 is a flowchart illustrating a method of re-categorizing contributions, according to an example embodiment.

FIG. 7 is a flowchart of a method 400 of re-categorizing contributions (e.g., during a conference, such as a video presentation or audio presentation). At step 402, contributions are categorized using the techniques discussed herein, such as in response to the quantity of contributions being above a threshold. That is, categories are generated, and contributions are classified into the categories for display. The contributions and categories, as well as their association and other information, may also be stored. At step 404, a new contribution is received, such as via input from a user. At step 406, a determination is made regarding whether a new total quantity of contributions, which includes the categorized contributions plus the newly received contribution, is equal to a multiple of a set quantity (e.g., a quantity between 1 and 10, between 10 and 20, between 20 and 30, or more than 30).

At step 408, in response to determining the new total quantity of contributions is not equal to a multiple of the set quantity, no re-categorization is performed, and the new contribution is classified into an existing category that was previously generated (e.g., at step 402). In other words, a previous classification of contributions into categories is maintained, and the new contribution is also classified to one of such categories. However, in response to determining the new total quantity of contributions is equal to a multiple of the set quantity, at step 410, the contributions are re-categorized. That is, the previously categorized contributions and the newly received contribution are processed to generate updated categories, and each contribution is re-classified into the updated categories. In some circumstances, the updated categories generated during re-categorization may be the same as the categories generated during a previous categorization. However, in other circumstances, different categories, such as a new category, may be generated during re-categorization. In either case, the updated categories, as well as the classified contributions, may be displayed.

In this manner, the method 400 causes re-categorization of contributions to occur at a set frequency. In particular, contributions are re-categorized after every set quantity of new contributions are received. Thus, categorization of contributions is updated as new contributions are received. For example, performance of the method 400 to re-categorize contributions enables the categorization of contributions to remain accurate and organized, such as in circumstances in which the new contributions are directed to a different subject matter than that of the previous contributions. Moreover, the method 400 may avoid frequent or excessive re-categorization of contributions. For example, by limiting re-categorization of contributions to occur after every set quantity of new contributions, constant or unpredictable re-categorization of contributions (e.g., after each new contribution is received) may be avoided. Such re-categorization of contributions may be beneficial to avoid confusing users that are viewing the categorized contributions, such as by avoiding constant change in display of categories, as well as of their classified contributions. Additionally, re-categorization of contributions may consume resources (e.g., energy, operational bandwidth), so limiting re-categorization of contributions to potentially more appropriate circumstances may reduce resource consumption while still providing benefits of categorizing contributions in an organized manner.

Figure 8:
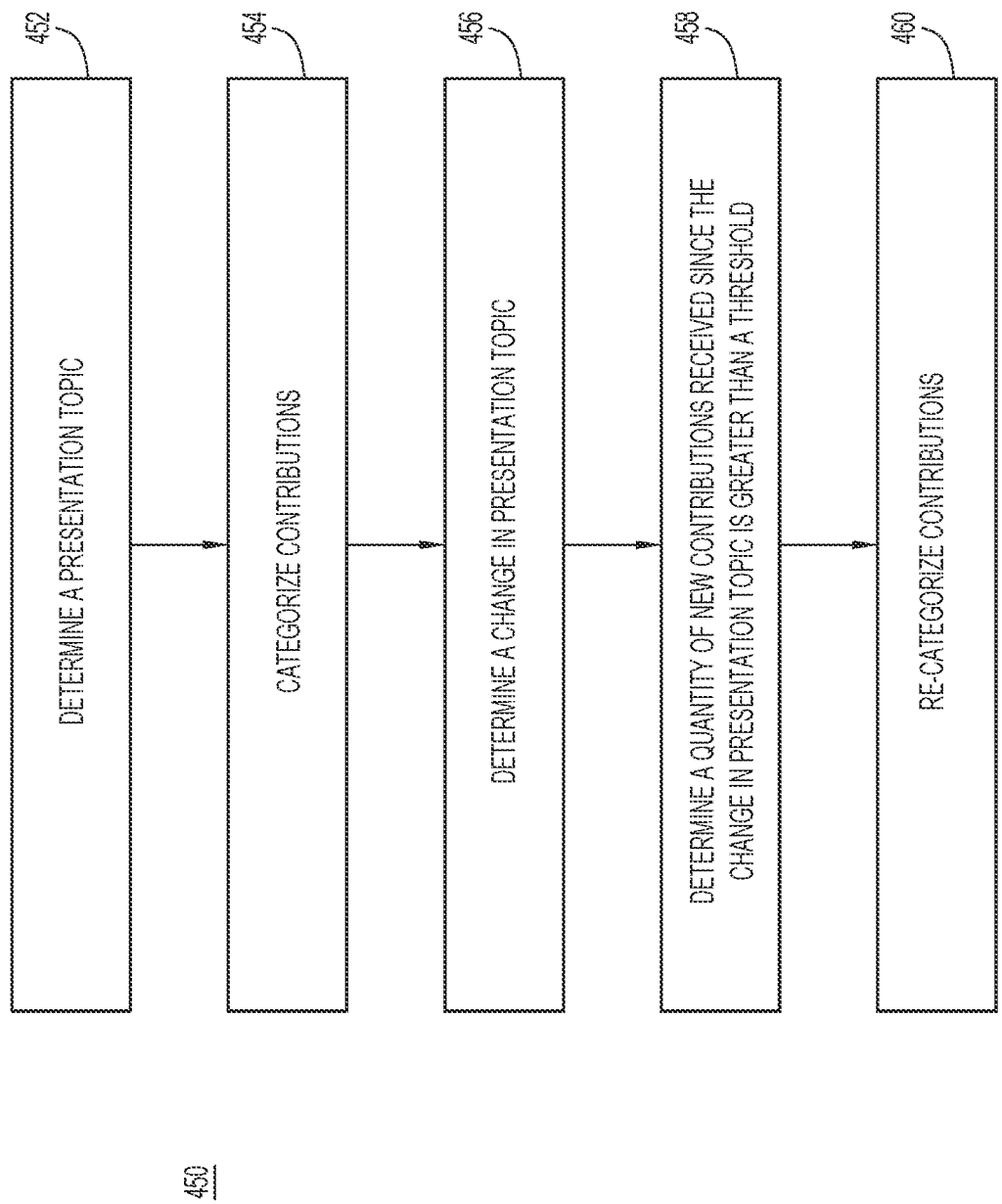
FIG. 8 is a flowchart illustrating another method of re-categorizing contributions, according to an example embodiment.

FIG. 8 is a flowchart of a method 450 of re-categorizing contributions (e.g., during a conference, such as a video presentation). At step 452, a presentation topic is determined. In some embodiments, the presentation topic is determined based on received audio signals, such as by determining subject matter related to words spoken by a presenter, and/or received video data, such as text being displayed. Thus, the subject matter may be automatically determined in such embodiments. In additional or alternative embodiments, the presentation topic is determined based a user input that may directly indicate the presentation topic. At step 454, received contributions are categorized in accordance with techniques discussed herein. Such contributions may have been received while the determined presentation topic is in effect.

At step 456, a change in the presentation topic is determined, such as automatically and/or based on a user input. After the change in the presentation topic is determined, new contributions may be received. For example, the new contributions may relate to a new presentation topic that is in effect. At step 458, a determination is made that a quantity of new contributions received since the change in presentation topic is greater than a threshold (e.g., a quantity between 1 and 5, between 5 and 10, or between 10 and 15). In response, at step 460, the contributions, including the new contributions and the previously categorized contributions, are re-categorized. For example, the new contributions may relate to a category that is more relevant to the new presentation topic, rather than to the previously determined presentation topic. Therefore, the new contributions may not be entirely relevant to any of the previously generated categories. Thus, re-categorization of the contributions may classify the new contributions more suitably, such as into newly generated categories.

In such embodiments, in response to determining the quantity of new contributions received since the change in presentation topic is not greater than the threshold, such new contributions may be classified into existing categories. In other words, classification of previous contributions into categories is maintained, and a new contribution may be classified into one of such categories until a sufficient quantity of new contributions have been received. By avoiding re-categorization of the contributions until the quantity of new contributions is greater than the threshold, re-categorization may be more suitably performed, such as when there is likely to be a sufficient amount of contributions (e.g., contributions related to the new presentation topic) of a new category. Therefore, contributions may be re-categorized more suitably, such as without confusing users and/or consuming resources, while still classifying the contributions into appropriate categories.

In some embodiments, in addition to re-categorization of contributions, a summary provided for each contribution may be updated after a change in presentation topic is determined. As an example, an existing summary of a contribution may not be relevant in view of the new presentation topic. Thus, updating the summary of the contribution, such as to have the summary be more relevant to the new presentation topic, may enable a more meaningful summary to be provided.

Figure 9:
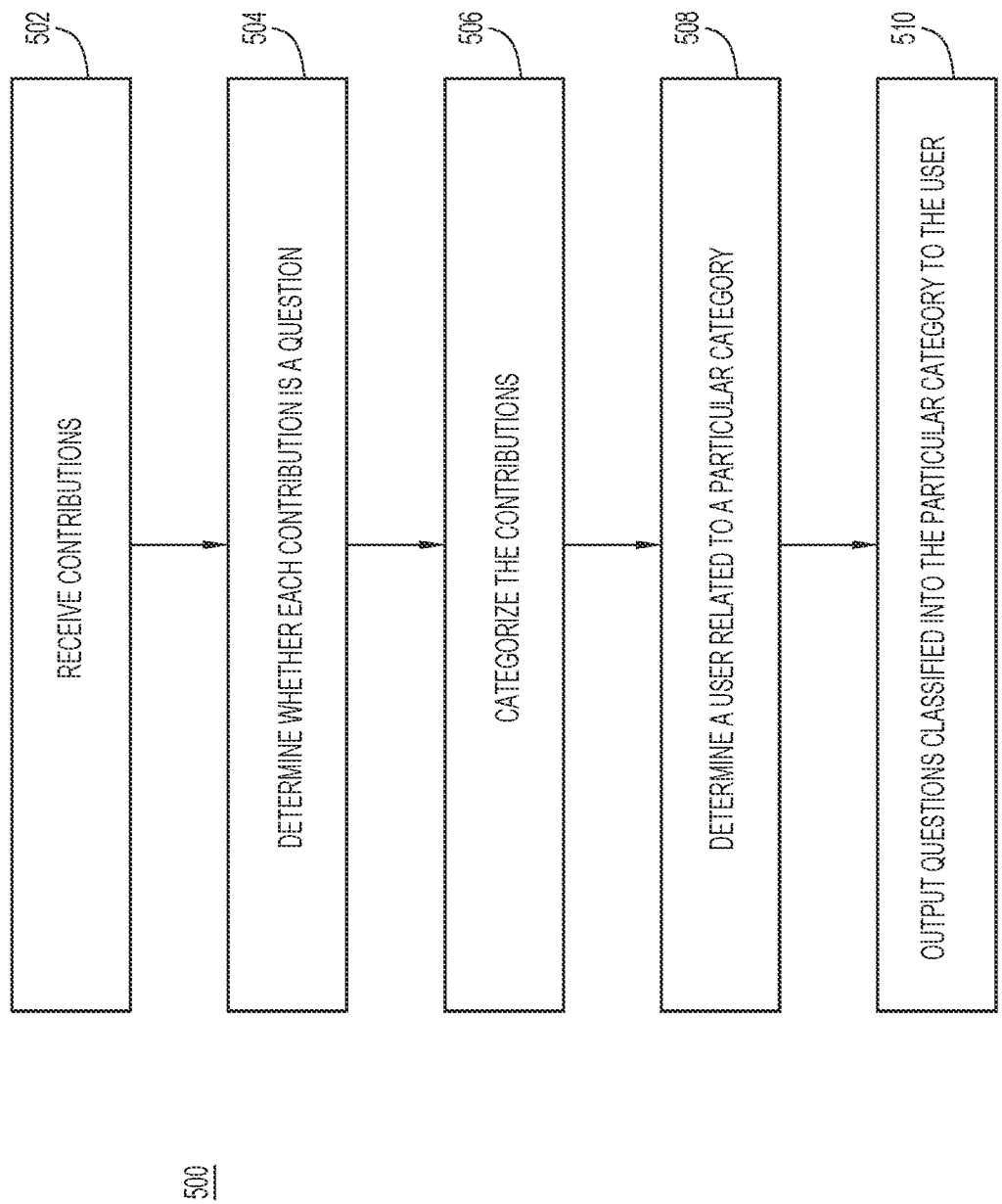
FIG. 9 is a flowchart illustrating a method of outputting questions to a user based on categories, according to an example embodiment.

FIG. 9 is a flowchart of a method 500 of outputting questions. At step 502, contributions are received. At step 504, a determination is made regarding whether each contribution is a question. For example, various information (e.g., keywords) contained in each contribution is extracted. At step 506, the contributions are classified into categories. At step 508, a user related to a particular category is determined. By way of example, the user is a moderator tasked with responding to questions, and the moderator is dedicated to (e.g., has expertise related to) the particular category. Thus, the moderator may be able to respond to questions related to the particular category more efficiently. At step 510, questions classified into the particular category are output to the user. The user may then be able to respond to such questions.

Performance of the method 500 may enable the user to respond to questions more efficiently. As an example, by avoiding the output of questions that are not classified into the particular category, the user may be able to view relevant questions in a more streamlined manner (e.g., without having to manually filter out or avoid questions that are not classified to the particular category). As another example, by avoiding the output of contributions that are not questions, the user may be able to respond to questions without having to manually filter out or avoid other types of contributions.

In additional or alternative embodiments, such as embodiments in which a user is not related to a particular category, questions classified into different categories may be output to a user. In such embodiments, the user may be able to select which category, as well as their classified questions, are to be displayed. For example, selection of the category by the user may remove or block questions classified into other categories from being displayed. As a result, the user may be able to view and respond to questions more effectively.

In some embodiments, questions may be marked by the user, and other users may be able to see the mark. For example, marking of a question may indicate that the question is currently being addressed by the user. Similarly, a category may be marked by the user to indicate multiple questions classified into the category are being addressed by the user. Thus, other users may avoid spending time to address the same question(s). Additionally, after a question is addressed, the question may be removed from display to other users to block the other users from responding to an already addressed question and to provide a cleaner and more succinct display of questions to the other users.

Figure 10:
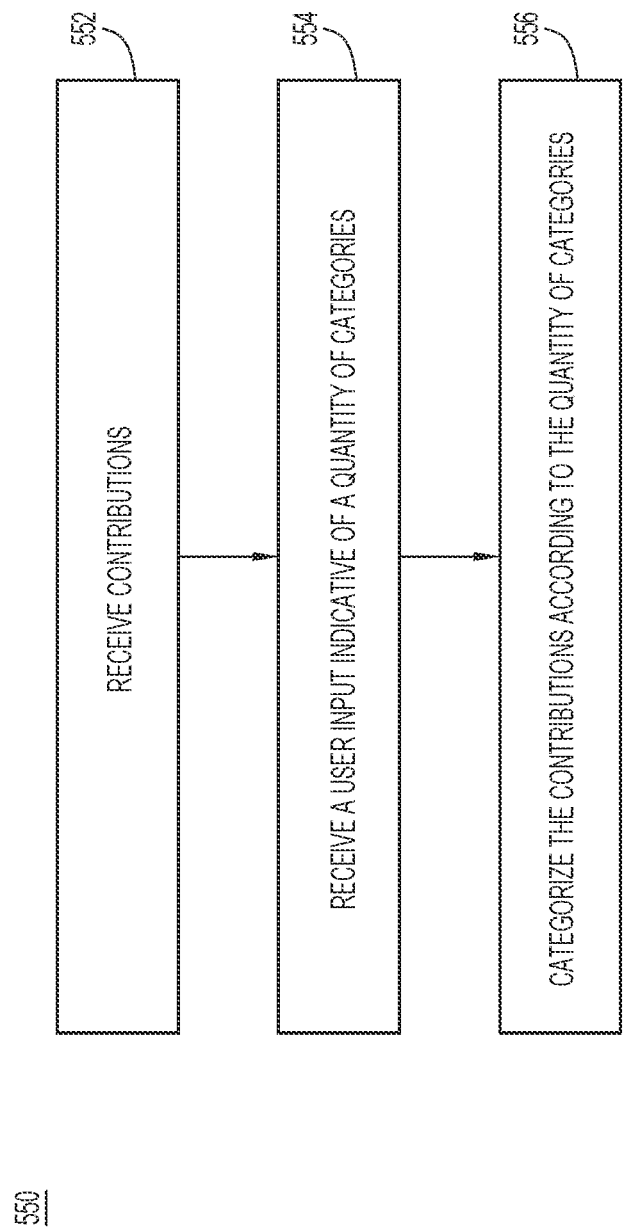
FIG. 10 is a flowchart illustrating a method of categorizing contributions based on a user input, according to an example embodiment.

FIG. 10 is a flowchart of a method 550 of categorizing contributions based on a user input. At step 552, contributions are received. At step 554, a user input indicative of a quantity of categories is received. At step 556, the contributions are categorized according to the quantity of categories and are displayed. For example, in response to receipt of a user input indicative of five categories, five categories are generated based on the contributions, and the contributions are classified into one of the five categories. As such, the user may customize how contributions are categorized and subsequently displayed. By way of example, the user may want to reduce the quantity of categories so that more contributions are grouped together. Thus, the user may transmit the user input to change the categorization of contributions and their subsequent display. In this way, the method 550 may be performed to accommodate the preferences of different users and improve their experiences.

It should be noted that different categories may be generated based on the indicated quantity. For instance, receipt of a user input indicative of a relatively greater quantity of categories may enable more specific categories to be generated. Generation of different categories and different quantities of categories may adjust the manner in which contributions are associated with the categories and the manner in which the categories are stored. As an example, a first set of categories may be generated based on receipt of a first user input indicative of a first quantity of categories, and a contribution may be associated with a first category of the first set of categories. A second set of categories may be generated based on receipt of a second user input indicative of a second quantity of categories, and the same contribution may be associated with a second category, different from the first category, of the second set of categories. Thus, the same contribution may be associated with different categories based on different quantities of categories indicated by user inputs. Indeed, the same contribution may be associated with different categories even though the first set of categories and the second set of categories may include some overlap or common categories. Thus, storage of the categories and the association of contributions with the categories may also be different.

Figure 11:
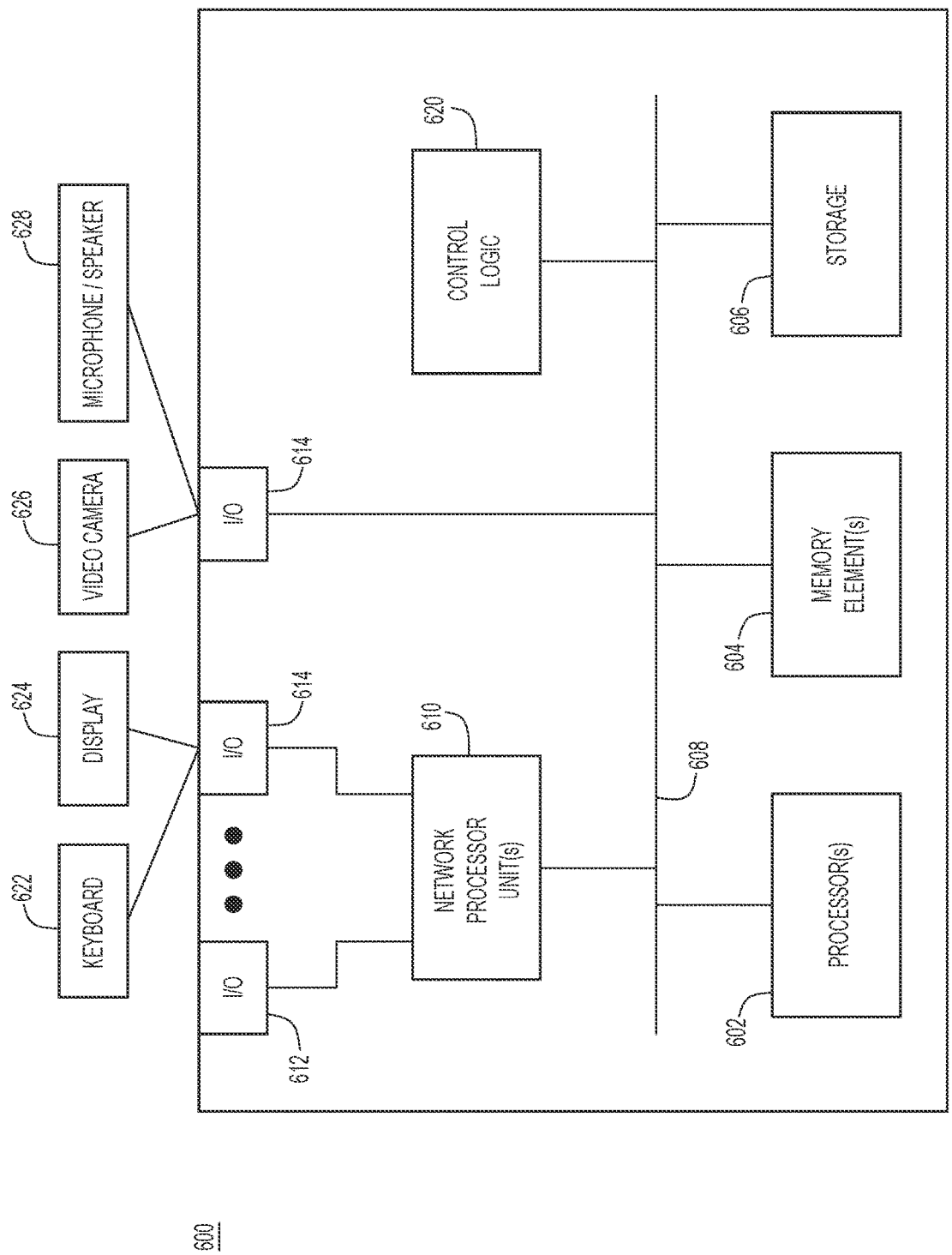
FIG. 11 is a hardware block diagram of a device that may be configured to perform endpoint device-based operations involved in organizing and categorizing contributions, according to an example embodiment.

Referring to FIG. 11, FIG. 11 illustrates a hardware block diagram of a computing/computer device 600 that may perform functions of an endpoint device or an end device associated with operations discussed herein. In various embodiments, a computing device, such as computing device 600 or any combination of computing devices 600, may be configured as any devices as discussed for the techniques depicted herein in order to perform operations of the various techniques discussed herein.

In at least one embodiment, the computing device 600 may include one or more processor(s) 602, one or more memory element(s) 604, storage 606, a bus 608, one or more network processor unit(s) 610 interconnected with one or more network input/output (I/O) interface(s) 612, one or more I/O interface(s) 614, and control logic 620. In various embodiments, instructions associated with logic for the computing device 600 can overlap in any manner and are not limited to the specific allocation of instructions and/or operations described herein.

In at least one embodiment, processor(s) 602 is/are at least one hardware processor configured to execute various tasks, operations and/or functions for computing device 600 as described herein according to software and/or instructions configured for computing device 600. Processor(s) 602 (e.g., a hardware processor) can execute any type of instructions associated with data to achieve the operations detailed herein. In one example, processor(s) 602 can transform an element or an article (e.g., data, information) from one state or thing to another state or thing. Any of potential processing elements, microprocessors, digital signal processor, baseband signal processor, modem, a physical layer (PHY), controllers, systems, managers, logic, and/or machines described herein can be construed as being encompassed within the broad term 'processor'.

In at least one embodiment, memory element(s) 604 and/or storage 606 is/are configured to store data, information, software, and/or instructions associated with computing device 600, and/or logic configured for memory element(s) 604 and/or storage 606. For example, any logic described herein (e.g., control logic 620) can, in various embodiments, be stored for computing device 600 using any combination of memory element(s) 604 and/or storage 606. Note that in some embodiments, storage 606 can be consolidated with memory element(s) 604 (or vice versa), or can overlap/exist in any other suitable manner.

In at least one embodiment, bus 608 can be configured as an interface that enables one or more elements of computing device 600 to communicate in order to exchange information and/or data. Bus 608 can be implemented with any architecture designed for passing control, data and/or information between processors, memory elements/storage, peripheral devices, and/or any other hardware and/or software components that may be configured for computing device 600. In at least one embodiment, bus 608 may be implemented as a fast kernel-hosted interconnect, potentially using shared memory between processes (e.g., logic), which can enable efficient communication paths between the processes.

In various embodiments, network processor unit(s) 610 may enable communication between computing device 600 and other systems, entities, etc., via network I/O interface(s) 612 (wired and/or wireless) to facilitate operations discussed for various embodiments described herein. Examples of wireless communication capabilities include short-range wireless communication (e.g., Bluetooth), wide area wireless communication (e.g., 4G, 5G, etc.). In various embodiments, network processor unit(s) 610 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 600 and other systems, entities, etc. to facilitate operations for various embodiments described herein. In various embodiments, network I/O interface(s) 612 can be configured as one or more Ethernet port(s), Fibre Channel ports, any other I/O port(s), and/or antenna(s)/antenna array(s) now known or hereafter developed. Thus, the network processor unit(s) 610 and/or network I/O interface(s) 612 may include suitable interfaces for receiving, transmitting, and/or otherwise communicating data and/or information in a network environment.

I/O interface(s) 614 allow for input and output of data and/or information with other entities that may be connected to computing device 600. For example, I/O interface(s) 614 may provide a connection to external devices such as a keyboard 622, keypad, a touch screen, and/or any other suitable input and/or output device now known or hereafter developed. This may be the case, in particular, when the computing device 600 serves as a user device described herein. In some instances, external devices can also include portable computer-readable (non-transitory) storage media such as database systems, thumb drives, portable optical or magnetic disks, and memory cards. In still some instances, external devices can be a mechanism to display data to a user, such as, for example, a computer monitor, a display screen, such as display 624 shown in FIG. 11, particularly when the computing device 600 serves as a user device as described herein. Display 624 may have touch-screen display capabilities. Additional external devices may include a video camera 626 and microphone/speaker combination 628. While FIG. 11 shows the display 624, video camera 626, and microphone/speaker combination 628 as being coupled via one of the I/O interfaces 614, it is to be understood that these components may instead be coupled to the bus 608.

In various embodiments, control logic 620 can include instructions that, when executed, cause processor(s) 602 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 620) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer-readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 604 and/or storage 606 can store data, software, code, instructions (e.g., processor instructions), logic, parameters, combinations thereof, and/or the like used for operations described herein. This includes memory element(s) 604 and/or storage 606 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer-useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer-readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer-readable storage medium.

Figure 12:
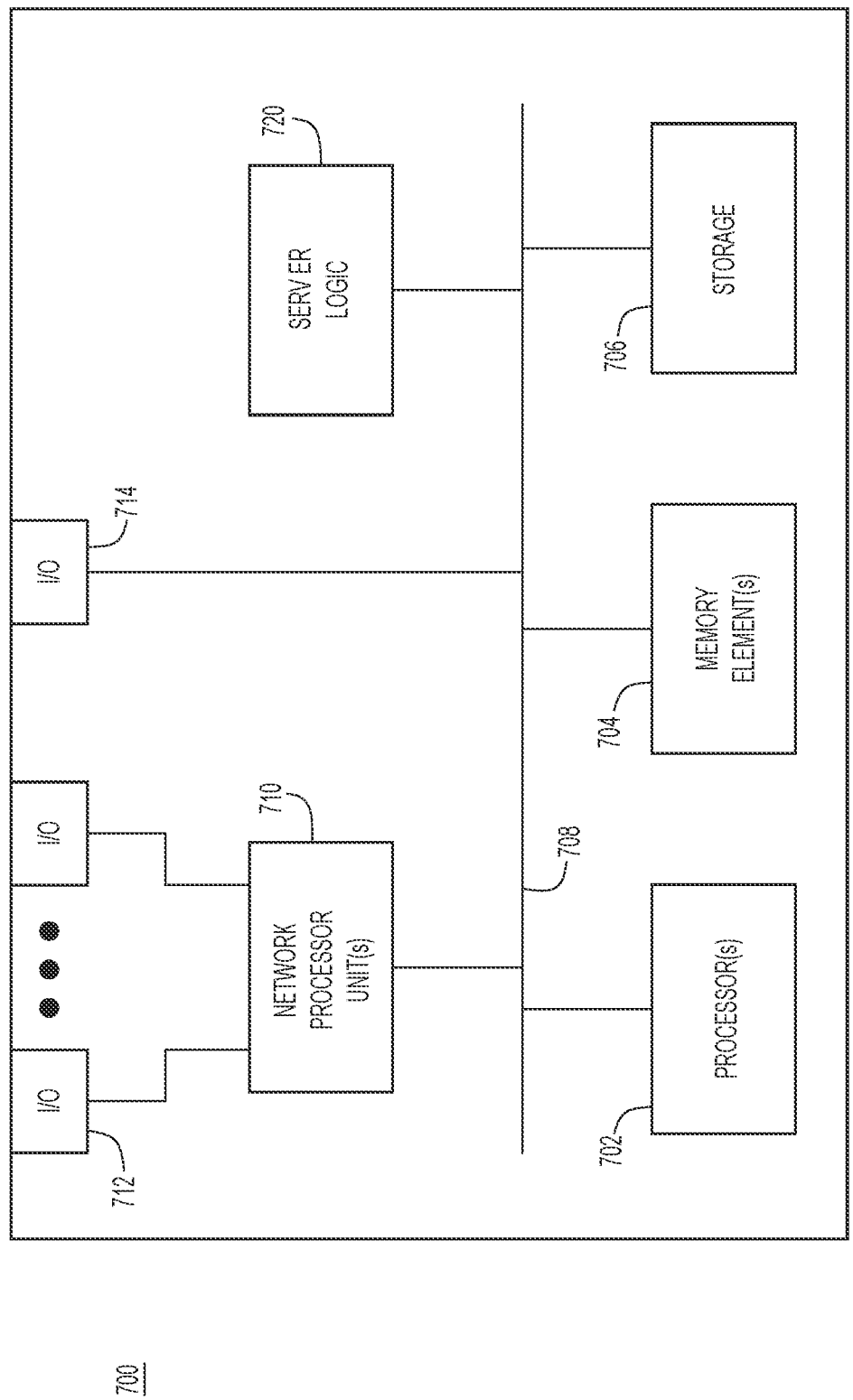
FIG. 12 is a hardware block diagram of a device that may be configured to perform server device-based operations involved in organizing and categorizing contributions, according to an example embodiment.

FIG. 12 illustrates a block diagram of a computing device 700 that may perform the functions of the server device(s) 102 described herein. The computing device 700 may include one or more processor(s) 702, one or more memory element(s) 704, storage 706, a bus 708, one or more network processor unit(s) 710 interconnected with one or more network input/output (I/O) interface(s) 712, one or more I/O interface(s) 714, and server logic 720. In various embodiments, instructions associated with the server logic 720 are configured to perform the server operations described herein, including those depicted by the flow chart for the methods 350, 400, 450, 550, 550.

In some aspects, the techniques described herein relate to a non-transitory computer-readable medium including instructions that, when executed by one or more processors, cause the one or more processors to perform operations including: receiving a contribution provided by a participant in a video session and/or audio session; determining whether a type of the contribution is a question-type or a comment-type; storing the contribution and its type; determining whether a total quantity of received contributions exceeds a threshold; classifying each received contribution into an appropriate category of a plurality of categories in response to determining the total quantity of received contributions exceeds the threshold; and outputting the received contributions and the plurality of categories for display to one or more additional participants in the video session and/or audio session.

In some aspects, the techniques described herein relate to a non-transitory computer-readable medium, wherein the instructions, when executed by the one or more processors, cause the one or more processors to perform operations including: determining a user related to a category of the plurality of categories; identifying the received contributions classified into the category; and selecting a question from the received contributions classified into the category to output for display to the user.

In some aspects, the techniques described herein relate to a non-transitory computer-readable medium, wherein the instructions, when executed by the one or more processors, cause the one or more processors to perform operations including: determining respective timestamps associated with each received contribution and each category of the plurality of categories; and storing the received contributions, the plurality of categories, and the respective timestamps.

In some aspects, the techniques described herein relate to a non-transitory computer-readable medium, wherein the instructions, when executed by the one or more processors, cause the one or more processors to perform operations including: receiving a user input from a user, wherein the user input is indicative of a selected timestamp of the respective timestamps; and outputting a received contribution and a category of the plurality of categories associated with the selected timestamp for display to the user.

In some aspects, the techniques described herein relate to a non-transitory computer-readable medium, wherein the instructions, when executed by the one or more processors, cause the one or more processors to perform operations including: receiving an additional user input from the user, wherein the additional user input is indicative of an additional selected timestamp of the respective timestamps; and blocking display of the received contribution and the category of the plurality of categories to the user based on the received contributions and the category not being associated with the additional selected timestamp.

In some aspects, the techniques described herein relate to a non-transitory computer-readable medium, wherein the instructions, when executed by the one or more processors, cause the one or more processors to perform operations including: determining a presentation topic at each respective timestamp; and outputting the presentation topic at the selected timestamp for display to the user.

In some aspects, the techniques described herein relate to a non-transitory computer-readable medium, wherein the instructions, when executed by the one or more processors, cause the one or more processors to perform operations including: receiving a user input from a user, wherein the user input is indicative of a quantity of categories; generating the plurality of categories based on the received contributions such that a quantity of the plurality of categories and the quantity of categories indicated by the user input match one another; and classifying each received contribution into the appropriate category of the plurality of categories upon generating the plurality of categories.

In some aspects, the techniques described herein relate to a non-transitory computer-readable medium, wherein the instructions, when executed by the one or more processors, cause the one or more processors to perform operations including: generating respective summaries for each of the received contributions; and outputting the respective summaries for display to the one or more additional participants in the video session and/or audio session.

In some aspects, the techniques described herein relate to a non-transitory computer-readable medium, wherein the instructions, when executed by the one or more processors, cause the one or more processors to perform operations including: receiving a user input from a user, wherein the user input is indicative of a quantity of summary words; and generating the respective summaries for each of the received contributions such that a quantity of words in each of the respective summaries and the quantity of summary words indicated by the user input match one another.

In some aspects, the techniques described herein relate to a non-transitory computer-readable medium, wherein the instructions, when executed by the one or more processors, cause the one or more processors to perform operations including: receiving an additional contribution after classifying each received contribution into the appropriate category of the plurality of categories; and re-classifying each received contribution into a new appropriate category of a plurality of new categories based on a comparison of the received contributions and the additional contribution with an additional threshold.

In some aspects, the techniques described herein relate to a non-transitory computer-readable medium, wherein the instructions, when executed by the one or more processors, cause the one or more processors to perform operations including classifying each received contribution into the appropriate category of the plurality of categories using a large language model (LLM).

In some aspects, the techniques described herein relate to a method including: receiving, via a server, a first plurality of contributions provided in a video session and/or audio session; categorizing, via the server, the first plurality of contributions into categories; outputting, via the server, the first plurality of contributions and their categories for display to one or more participants in the video session and/or audio session; receiving, via the server, a second plurality of contributions provided in the video session and/or audio session; updating, via the server, categorization of the first plurality of contributions and of the second plurality of contributions based on comparison of a quantity of the second plurality of contributions with a threshold; and outputting, via the server, the first plurality of contributions, the second plurality of contributions, and their updated categories for display to the one or more participants in the video session and/or audio session.

In some aspects, the techniques described herein relate to a method, further including: determining, via the server, a change in presentation topic of the video session and/or audio session; receiving, via the server, the second plurality of contributions after the change in the presentation topic of the video session and/or audio session; determining, via the server, a quantity of the second plurality of contributions is greater than the threshold; and updating, via the server, the categorization of the first plurality of contributions and of the second plurality of contributions in response to determining the quantity of the second plurality of contributions is greater than the threshold.

In some aspects, the techniques described herein relate to a method, further including: determining, via the server, a change in presentation topic of the video session and/or audio session; receiving, via the server, the second plurality of contributions after the change in the presentation topic of the video session and/or audio session; determining, via the server, a quantity of the second plurality of contributions is less than the threshold; and classifying, via the server, the second plurality of contributions into the categories associated with the first plurality of contributions in response to determining the quantity of the second plurality of contributions is less than the threshold.

In some aspects, the techniques described herein relate to a method, further including: comparing, via the server, a total quantity of the first plurality of contributions and the second plurality of contributions with the threshold; and updating, via the server, the categorization of the first plurality of contributions and of the second plurality of contributions in response to determining the total quantity of the first plurality of contributions and the second plurality of contributions is a multiple of the threshold.

In some aspects, the techniques described herein relate to a method, further including: determining, via the server, a type of each contribution of the first plurality of contributions and of the second plurality of contributions; determining, via the server, a user associated with a selected updated category; and selecting, via the server, a third plurality of contributions from the first plurality of contributions and the second plurality of contributions for display to the user based on the third plurality of contributions being classified into the selected updated category and based on the type of each contribution of the third plurality of contributions being a question.

In some aspects, the techniques described herein relate to an apparatus including: a memory storing instructions thereon; and one or more processors configured to execute the instructions stored on the memory to perform operations including: receiving a first plurality of contributions provided in a video session and/or audio session; classifying the first plurality of contributions into a plurality of categories; outputting the first plurality of contributions and the plurality of categories for display to one or more participants in the video session and/or audio session; receiving a second plurality of contributions provided in the video session and/or audio session; classifying the first plurality of contributions and the second plurality of contributions into a plurality of new categories based on comparison of a total quantity of the first plurality of contributions and the second plurality of contributions with a threshold; and outputting the first plurality of contributions, the second plurality of contributions, and the plurality of new categories for display to the one or more participants in the video session and/or audio session.

In some aspects, the techniques described herein relate to an apparatus, wherein the one or more processors are configured to execute the instructions stored on the memory to perform operations including classifying the first plurality of contributions and the second plurality of contributions into the plurality of new categories based on the total quantity of the first plurality of contributions and the second plurality of contributions being a multiple of the threshold.

In some aspects, the techniques described herein relate to an apparatus, wherein the one or more processors are configured to execute the instructions stored on the memory to perform operations including classifying the second plurality of contributions into the plurality of categories into which the first plurality of contributions is classified based on the total quantity of the first plurality of contributions and the second plurality of contributions not being a multiple of the threshold.

In some aspects, the techniques described herein relate to an apparatus, wherein the one or more processors are configured to execute the instructions stored on the memory to perform operations including: determining a change in presentation topic of the video session and/or audio session; receiving the second plurality of contributions after the change in the presentation topic of the video session and/or audio session; and classifying the first plurality of contributions and the second plurality of contributions into an additional plurality of new categories based on a quantity of the second plurality of contributions being greater than an additional threshold.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are include' in one or more embodiment's of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A non-transitory computer-readable medium comprising instructions that, when executed by one or more processors, cause the one or more processors to perform operations comprising:

receiving a contribution provided by a participant in a video session and/or audio session;
determining whether a type of the contribution is a question-type or a comment-type;
storing the contribution and its type;
determining whether a total quantity of received contributions exceeds a threshold;
classifying each received contribution into an appropriate category of a plurality of categories in response to determining the total quantity of received contributions exceeds the threshold;
outputting the received contributions and the plurality of categories for display to one or more additional participants in the video session and/or audio session;
receiving an additional contribution after classifying each received contribution into the appropriate category of the plurality of categories; and
re-classifying each received contribution into a new appropriate category of a plurality of new categories based on a comparison of the received contributions and the additional contribution with an additional threshold.

2. The non-transitory computer-readable medium of claim 1, wherein the instructions, when executed by the one or more processors, cause the one or more processors to perform operations comprising:
determining a user related to a category of the plurality of categories;
identifying the received contributions classified into the category; and
selecting a question from the received contributions classified into the category to output for display to the user.

3. The non-transitory computer-readable medium of claim 1, wherein the instructions, when executed by the one or more processors, cause the one or more processors to perform operations comprising:
determining respective timestamps associated with each received contribution and each category of the plurality of categories; and
storing the received contributions, the plurality of categories, and the respective timestamps.

4. The non-transitory computer-readable medium of claim 3, wherein the instructions, when executed by the one or more processors, cause the one or more processors to perform operations comprising:
receiving a user input from a user, wherein the user input is indicative of a selected timestamp of the respective timestamps; and
outputting a received contribution and a category of the plurality of categories associated with the selected timestamp for display to the user.

5. The non-transitory computer-readable medium of claim 4, wherein the instructions, when executed by the one or more processors, cause the one or more processors to perform operations comprising:
receiving an additional user input from the user, wherein the additional user input is indicative of an additional selected timestamp of the respective timestamps; and
blocking display of the received contribution and the category of the plurality of categories to the user based on the received contributions and the category not being associated with the additional selected timestamp.

6. The non-transitory computer-readable medium of claim 4, wherein the instructions, when executed by the one or more processors, cause the one or more processors to perform operations comprising:
determining a presentation topic at each respective timestamp; and
outputting the presentation topic at the selected timestamp for display to the user.

7. The non-transitory computer-readable medium of claim 1, wherein the instructions, when executed by the one or more processors, cause the one or more processors to perform operations comprising:
receiving a user input from a user, wherein the user input is indicative of a quantity of categories;
generating the plurality of categories based on the received contributions such that a quantity of the plurality of categories and the quantity of categories indicated by the user input match one another; and
classifying each received contribution into the appropriate category of the plurality of categories upon generating the plurality of categories.

8. The non-transitory computer-readable medium of claim 1, wherein the instructions, when executed by the one or more processors, cause the one or more processors to perform operations comprising:
receiving a user input from a user, wherein the user input is indicative of a quantity of summary words; and
generating respective summaries for each of the received contributions such that a quantity of words in each of the respective summaries and the quantity of summary words indicated by the user input match one another.

9. A method comprising:
receiving, via a server, a first plurality of contributions provided in a video session and/or audio session;
categorizing, via the server, the first plurality of contributions into categories;
outputting, via the server, the first plurality of contributions and their categories for display to one or more participants in the video session and/or audio session;
receiving, via the server, a second plurality of contributions provided in the video session and/or audio session;
updating, via the server, categorization of the first plurality of contributions and of the second plurality of contributions based on comparison of a quantity of the second plurality of contributions with a threshold; and
outputting, via the server, the first plurality of contributions, the second plurality of contributions, and their updated categories for display to the one or more participants in the video session and/or audio session.

10. The method of claim 9, further comprising:
determining, via the server, a change in presentation topic of the video session and/or audio session;
receiving, via the server, the second plurality of contributions after the change in the presentation topic of the video session and/or audio session;
determining, via the server, the quantity of the second plurality of contributions is greater than the threshold; and
updating, via the server, the categorization of the first plurality of contributions and of the second plurality of contributions in response to determining the quantity of the second plurality of contributions is greater than the threshold.

11. The method of claim 9, further comprising:
determining, via the server, a change in presentation topic of the video session and/or audio session;
receiving, via the server, the second plurality of contributions after the change in the presentation topic of the video session and/or audio session;

determining, via the server, the quantity of the second plurality of contributions is less than the threshold; and classifying, via the server, the second plurality of contributions into the categories associated with the first plurality of contributions in response to determining the quantity of the second plurality of contributions is less than the threshold.

12. The method of claim 9, further comprising:

comparing, via the server, a total quantity of the first plurality of contributions and the second plurality of contributions with the threshold; and updating, via the server, the categorization of the first plurality of contributions and of the second plurality of contributions in response to determining the total quantity of the first plurality of contributions and the second plurality of contributions is a multiple of the threshold.

13. The method of claim 9, further comprising:

determining, via the server, a type of each contribution of the first plurality of contributions and of the second plurality of contributions;

determining, via the server, a user associated with a selected updated category; and selecting, via the server, a third plurality of contributions from the first plurality of contributions and the second plurality of contributions for display to the user based on the third plurality of contributions being classified into the selected updated category and based on the type of each contribution of the third plurality of contributions being a question.

14. An apparatus comprising:

a memory storing instructions thereon; and one or more processors configured to execute the instructions stored on the memory to perform operations comprising:

receiving a first plurality of contributions provided in a video session and/or audio session;

classifying the first plurality of contributions into a plurality of categories;

outputting the first plurality of contributions and the plurality of categories for display to one or more participants in the video session and/or audio session;

receiving a second plurality of contributions provided in the video session and/or audio session;

classifying the first plurality of contributions and the second plurality of contributions into a plurality of new categories based on comparison of a total quantity of the first plurality of contributions and the second plurality of contributions with a threshold; and outputting the first plurality of contributions, the second plurality of contributions, and the plurality of new categories for display to the one or more participants in the video session and/or audio session.

15. The apparatus of claim 14, wherein the one or more processors are configured to execute the instructions stored on the memory to perform operations comprising classifying the first plurality of contributions and the second plurality of contributions into the plurality of new categories based on the total quantity of the first plurality of contributions and the second plurality of contributions being a multiple of the threshold.

16. The apparatus of claim 14, wherein the one or more processors are configured to execute the instructions stored on the memory to perform operations comprising classifying the second plurality of contributions into the plurality of categories into which the first plurality of contributions is classified based on the total quantity of the first plurality of contributions and the second plurality of contributions not being a multiple of the threshold.

17. The apparatus of claim 14, wherein the one or more processors are configured to execute the instructions stored on the memory to perform operations comprising:

determining a change in presentation topic of the video session and/or audio session;

receiving the second plurality of contributions after the change in the presentation topic of the video session and/or audio session; and classifying the first plurality of contributions and the second plurality of contributions into an additional plurality of new categories based on a quantity of the second plurality of contributions being greater than an additional threshold.

18. A non-transitory computer-readable medium comprising instructions that, when executed by one or more processors, cause the one or more processors to perform operations comprising:

receiving a contribution provided by a participant in a video session and/or audio session;

determining whether a type of the contribution is a question-type or a comment-type;

storing the contribution and its type;

determining whether a total quantity of received contributions exceeds a threshold;

classifying each received contribution into an appropriate category of a plurality of categories in response to determining the total quantity of received contributions exceeds the threshold;

outputting the received contributions and the plurality of categories for display to one or more additional participants in the video session and/or audio session;

determining respective timestamps associated with each received contribution and each category of the plurality of categories; and storing the received contributions, the plurality of categories, and the respective timestamps.

19. The non-transitory computer-readable medium of claim 18, wherein the instructions, when executed by the one or more processors, cause the one or more processors to perform operations comprising:

blocking classification of each received contribution into the appropriate category of the plurality of categories in response to determining the total quantity of received contributions does not exceed the threshold.

20. The non-transitory computer-readable medium of claim 18, wherein the instructions, when executed by the one or more processors, cause the one or more processors to perform operations comprising:

determining a change in presentation topic of the video session and/or audio session; and re-classifying each received contribution into a new appropriate category of a plurality of new categories after determining the change in presentation topic of the video session and/or audio session.

* * * * *